July 29, 1958    D. E. CARPENTER ET AL    2,845,555
MOTORS
Filed Sept. 12, 1955    2 Sheets-Sheet 1
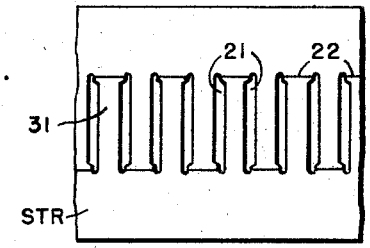
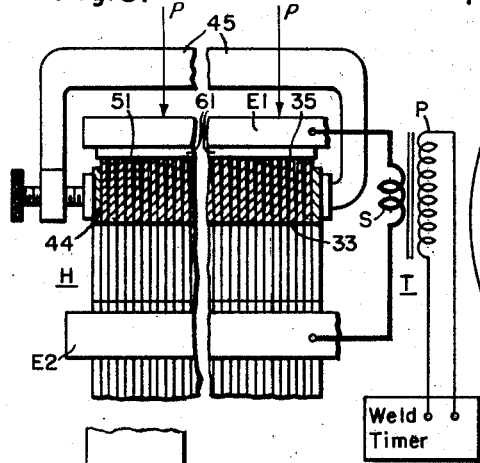
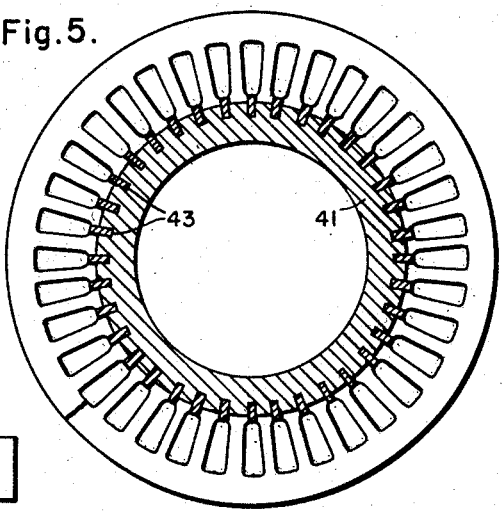
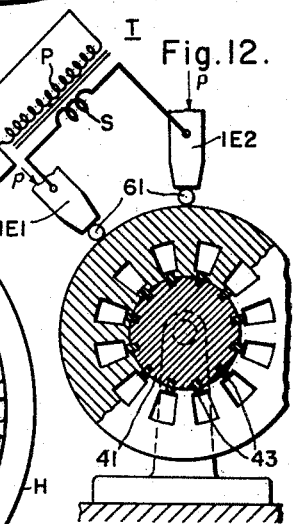
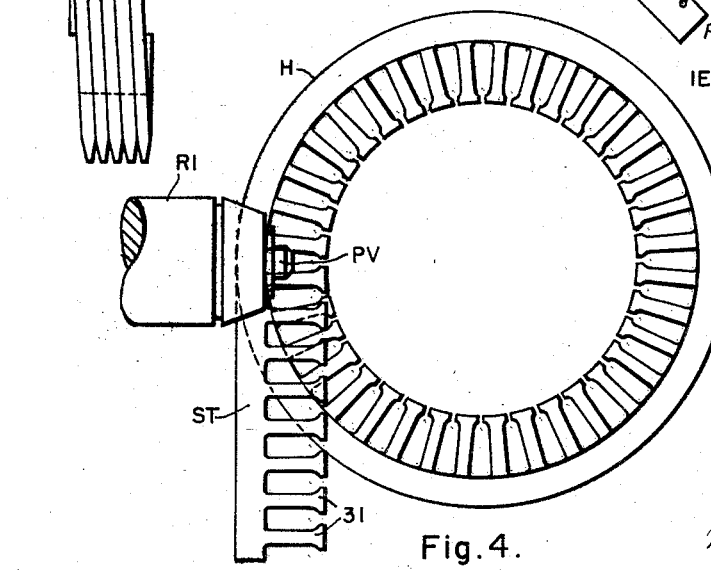
INVENTORS
David E. Carpenter
& Arland F. Palmer
BY
*Hymen Diamond*
ATTORNEY July 29, 1958 D. E. CARPENTER ET AL 2,845,555
MOTORS
Filed Sept. 12, 1955 2 Sheets-Sheet 2

United States Patent Office 2,845,555
Patented July 29, 1958

2,845,555

MOTORS

David E. Carpenter and Arland F. Palmer, Springfield, Mass., assignors to Westinghouse Electric Corporation, East Pittsburgh, Pa., a corporation of Pennsylvania Application September 12, 1955, Serial No. 533,613

9 Claims. (Cl. 310—216)

This invention relates to motors and has particular relation to the magnetic parts of motors which are produced by stacking laminations and to methods of making such stacked parts. In practice, this invention is applied principally to stators of motors but may also be applied with advantage to rotors.

In Patent 1,920,354 to David E. Carpenter there is disclosed a stacked part of a motor and a method for making such a part. The principal feature of this motor is that the stacked part, usually the stator, comprises an edge-wound helix, the laminations being the turns of the helix. As is pointed out in the patent, a motor of the type therein disclosed may be made at a substantially lower cost than motors of the then prior art type because of the saving in material which is effected in the forming of the laminations. In accordance with the teachings of this Carpenter patent, the laminations are held or bound together by an insulating impregnating material. It has been found that a stacked unit so held together is not entirely satisfactory because the laminations, having considerable resilience, tend to become loosened.

It is accordingly broadly an object of this invention to provide a rigid stacked part, the laminations of which consist of the turns of an edge-wound helix for a motor.

It is a further object of this invention to provide a stacked magnetic part consisting of a compressed edge-wound helix, the turns of which shall be rigidly and permanently held together for a motor.

Another object of this invention is to provide a method for rigidly and permanently joining the turns of an edge-wound helix into a stacked magnetic part of a motor.

In accordance with the broader aspects of this invention, a stacked part of a motor is formed by compressing an edge-wound helix and joining the compressed turns along their peripheries by welds extending transverse to the peripheries. Joints of this type have the advantage that they are not, to any substantial extent, threaded by the magnetic fields in the motor and thus do not distort these fields.

But in the past, the joining in this way of compressed laminated structures made up of separate laminations has presented difficulties. The principal difficulty resides in the fact that unless the lamination stack is grooved transversely to the periphery of the laminations, the weld remains in the surface of the stack and subsequent machining removes the joints.

It is then a specific object of this invention to provide a method of joining the turns of a compressed edge-wound helix into a rigid stacked motor part by welding without providing grooves in the surface of the stack, and an ancillary object of this invention is to provide such a method which shall result in welds that shall penetrate into the stack sufficiently to permit machining of the stack without disturbing the cohesive forces of the weld.

A broad object of this invention is to provide a novel stacked motor part and a method for making such a part either from separate laminations or from an edge-wound helix.

This invention arises from the realization that because each of the laminations of an edge-wound helix is tapered so that the thickness of each lamination decreases from the teeth to the periphery, there are spaces between the laminations along the periphery and these spaces allow for effectively welding the stacked part into a permanently rigid unit. This is possible because a small rod of fusible material such as mild steel can be displaced into the periphery by virtue of the spaces between laminations allowing such displacement. In accordance with the specific aspects of this invention, a stacked part consisting of a strip formed into an edge-wound helix is joined into a permanently rigid unit by mash welding a plurality of rods transversely to the peripheries of the laminations by a process which may be described as cross wire resistance welding. During the mash welding operation, the melted metal from the rods penetrates into the spaces between the individual laminations. Since the melted metal thus penetrates into the spaces between the laminations, the laminations are held together tightly. The machining of the surface of the stack after the welding does not effect the cohesion of the melted metal and the laminations because only a thin layer of the surface is machined off and the melted metal holding the laminations together has penetrated below this surface and is not affected.

While this invention is of particular utility in the forming of stacked parts from edge-wound helices, it is also applicable to the forming of stacked parts from separate laminations, each of which is tapered in the same manner as the turns of the helices. Such stacked parts made from separate laminations and the method of making stacked parts are within the broader scope of this invention.

The novel features considered characteristic of this invention are discussed generally above. The invention itself, both as to its organization and its method of operation, together with additional objects and advantages thereof, will be understood from the following description of specific embodiments when read in connection with the accompanying drawings, in which:

Figure 1 is a view in plan of a strip from which the stacked parts in accordance with this invention are formed;

Fig. 4 is a view, partly in perspective and partly in plan, showing the manner in which a helix is formed with the apparatus shown in Fig. 2;

Fig. 5 is a view partly in section and partly in elevation of a helix of the type made with the apparatus shown in Fig. 2 in the course of being prepared for the joining operation;

Fig. 8 is a diagrammatic view showing apparatus for welding an edge-wound helix into a rigid stack in accordance with this invention;

Fig. 12 is a diagrammatic view showing apparatus different from that shown in Fig. 8 for welding an edge-wound helix into a rigid stacked part; and Fig. 13 is a diagrammatic view based on Fig. 12 and showing the relationship between one of the welding electrodes and the work.

In Fig. 1 a strip STR for making a stator of a motor is shown. This strip is of magnetic material, such as oriented silicon steel. A plurality of slots 21 transverse to the strip S and a plurality of slits 22 between opposite ends of alternate pairs of transverse slots are stamped centrally in this strip by suitable punches and die sections. The strip STR is then separated into two strips ST each consisting of a ribbon or strip from which teeth 31 extend.

Figure 2:
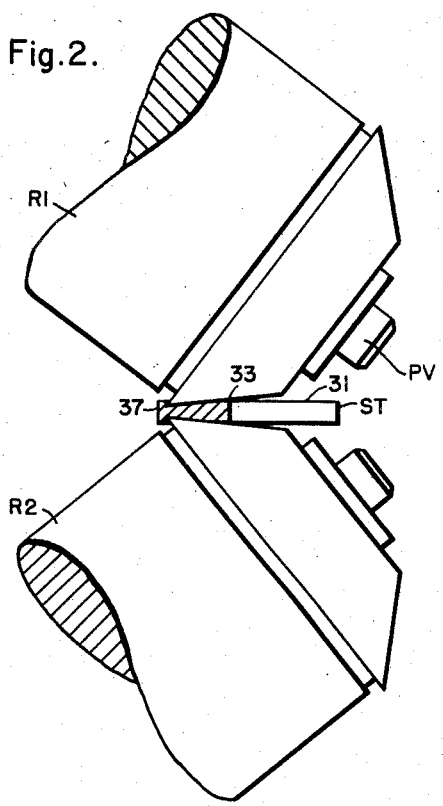
Fig. 2 is a view in perspective showing the principal components in their cooperative relationship of apparatus for forming an edge-wound helix of one type which is used in the practice of this invention.
Figure 3:
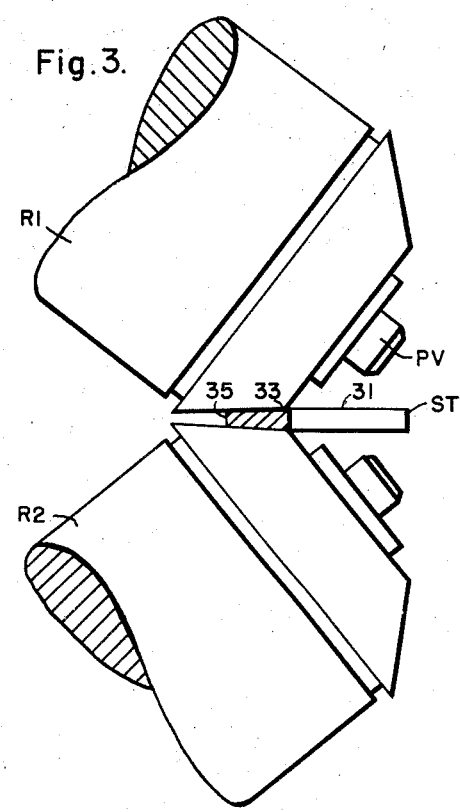
Fig. 3 is a view in perspective similar to Fig. 2 showing the essential parts for making an edge-wound helix of another type which is used in the practice of this invention.

The toothed strip ST formed as just disclosed is provided with a taper which extends from the roots of the teeth 31 to the periphery with apparatus, the principal components of which are shown in Figs. 2 and 3. This apparatus includes a pair of tapered rolls R1 and R2. The angle between the rolls R1 and R2 is adjustable by turning the roll R1 about a pivot PV. By adjusting this angle the taper may be set. The strip ST may be passed through the tapered rolls in the manner shown in Fig. 2 or in the manner shown in Fig. 3. In Fig. 3, the taper is continuous throughout, the metal at the roots 33 of the teeth 31 having the maximum thickness and the periphery 35 having the minimum thickness. The strip treated as shown in Fig. 2 has a taper from the roots 33 of the teeth 31 to a line near the periphery. At this point a thickened rim 37 is produced. This deformation of the strip is effected by rolling the strips with the tapered rolls with a narrow portion 37 of the strip extending beyond the rolls.

The tapering of the strip ST has the effect of increasing the longitudinal length in the regions 35 and just inside of 37 where the thickness of the metal is reduced and this has the effect of causing the strip to wind itself into an edge-wound helix H. In Fig. 2, where the periphery of the strip extends outside the roll edge and forms a small rim 37, the thickness at 37 is slightly less than the tooth 31, because even though 37 is not contacted by the rolls, this section is elongated longitudinally due to the rolling of adjacent material. This elongation causes a reduction in thickness at 37. The winding operation is shown in Fig. 4. It is seen that the strip ST starts to turn into a helix H just beyond the rollers R1 and R2 and that the axes of the rollers R1 and R2 intersect the axis of the helix.

Once the helix H is formed, it is placed over a keyed mandrel 41 with a key 43 for every core slot. The keys 43 extend only into the necks of the slots. The stack so keyed is tightly compressed between rings 44 with clamps 45 (Fig. 8) and thereafter, the mandrel and keys are removed. Preferably, four clamps 45 are distributed around the periphery.

Figure 7:
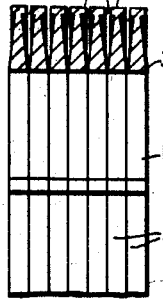
Fig. 7 is a view in section of a portion of a compressed edge-wound helix of the type made with the apparatus shown in Fig. 2.
Figure 6:
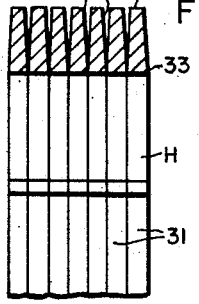
Fig. 6 is a view in section of a portion of a compressed edge-wound helix of the type made with the apparatus shown in Fig. 3.

The stacks as compressed by the clamp 45 with the mandrel removed are shown in Figs. 6 and 7. In the compressed stack shown in Fig. 6, there are narrowing slots 51 which extend from the peripheries 35 of the laminations to the roots 33 of the teeth, and in the Fig. 7 stack there are narrowing slots 53 which extend from the thickened portion 37 to the roots 33 of the slots.

The stacks are welded with the apparatus shown in Fig. 8. This apparatus includes a welding transformer T, the primary P of which is connected to a weld timer. The secondary S is connected between a pair of welding electrodes E1 and E2 of copper or other highly conducting material, one of which, E1, is in the form of an elongated bar, and the other in the form of a rod. The compressed helix H is mounted between the electrodes E1 and E2 with the elongated electrode E1 extending transversely to the peripheries of the turns in a position to engage a rod 61, preferably of steel, which is disposed on the helix transversely of the peripheries of the turns. Once the compressed helix is properly mounted between the electrodes E1 and E2, the timer is actuated, pressure P is applied to the electrodes E1 and E2 so that the rod 61 is compressed between the electrode E1 and the helix, and thereafter welding current flows. The flow of welding current fuses the rod into the periphery of the helix.

When the helix H is of the type shown in Fig. 6, the flow of the melted rod material is direct. When the helix is of the type shown in Fig. 7, the thickened portion 37 in the region in which the helix H is engaged by the rod 61 is first melted or upset. The thickened portion 37 must then be of such width as to permit the upsetting. Thus, the rod is displaced into the periphery of the helix, this displacement being allowed by the upsetting of the helix edges. In turn, the helix edges can be upset in this manner without the helix stack thickness increasing at this point, because the voids between helix turns allow displacement of the helix material.

Figure 11:
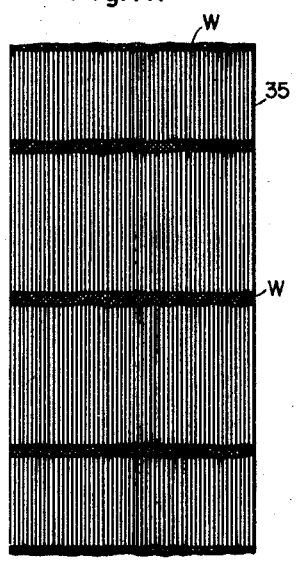
Fig. 11 is a view in side elevation of a stacked unit in accordane with this invention.
Figure 10:
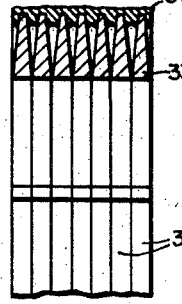
Fig. 10 is a view in section similar to Fig. 9 but showing a portion of an edge-wound helix of the type shown in Fig. 7.
Figure 9:
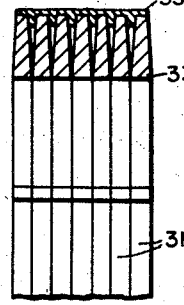
Fig. 9 is a view in section showing a portion of a welded edge-wound helix of the type shown in Fig. 6.

After the welding current flows, the timer times out, permitting the weld to solidify. Thereafter the helix, now to an extent rigid, may be removed from between the electrodes E1 and E2. In the preferred practice of this invention the helix is welded at a number of regions in the manner just described transversely to the peripheries of the laminations. When the welding is completed the stacked part is rigid and may be machined. As can be seen from Figs. 9 and 10, the rod material penetrates the periphery sufficiently to allow machining of the stack part without breaking the weld and not so deeply as to deteriorate the magnetic properties of the stack. The resulting structure is shown in Fig. 11.

In a typical situation a stator for a small motor may be produced in the manner just described. This stator may have a thickened rim 37. It may have an outside diameter of about 6 inches and an inside diameter of about 3½ inches. For such a stator, the strip ST has a width such that the outside diameter of the helix H is 6.015 before machining. The length of the teeth may be of the order of ¾ inch and the width of the ribbon from the roots 33 of the teeth to the periphery (37) may be about ½ inch. Such a stator is made by tapering and winding a ribbon of oriented silicon steel having a thickness of about .025 inch. Each lamination of this stator after being tapered and wound has a thickness of about .021 inch at the periphery just inside the rim 37. The thickness at the roots 33 of the teeth and the thickness of the teeth is about .025 inch. The lamination has a rim, as shown in Fig. 7, with a length of .023 inch and a width of about .010 inch.

In forming a helix, made of the just described ribbon, into a stator, eight rods cut from $\frac{3}{32}$ inch diameter mild steel wire are mash welded transversely to the peripheries of the laminations. The welded areas W may be produced in pairs with an area of each pair diametrically disposed with respect to a welded area of another pair.

The apparatus shown in Figs. 12 and 13 includes a pair of welding electrodes 1E1 and 1E2 connected to the secondary S of a welding transformer T. The primary P of this transformer is supplied from a timer in the same manner as the apparatus shown in Fig. 8.

In welding with the apparatus shown in Figs. 12 and 13, the keyed mandrel 41 remains in the helix H. The helix and mandrel assembly is mounted adjacent the electrodes 1E1 and 1E2 and is axially compressed by pneumatic or hydraulic pressure means (not shown). The electrodes 1E1 and 1E2 are then spaced the desired distance along the periphery of the helix H and are advanced to the periphery of the helix so that they engage rods 61 under pressure. Welding current is now supplied. This current flows from between the electrodes 1E1 and 1E2 through the rods 61 and through the adjacent rim of the helix H.

The apparatus shown in Figs. 12 and 13 has the advantages that the welding current does not flow through the teeth and the helix remains keyed during the welding. Improved rigidity is thus assured.

A stator of the type just described has been found to be rigid and to operate highly efficiently in a motor. The cost of this stator is substantially lower than the cost of stators produced from separate laminations in accordance with the teachings of the prior art. This stator is more rigid than the one disclosed in the Carpenter patent and than those made by other prior art methods.

While several embodiments of this invention have been disclosed herein, many modifications thereof are feasible. This invention, therefore, is not to be restricted except insofar as is necessitated by the spirit of the prior art.

We claim as our invention:

1. A stacked part for a motor such as a stator consisting of laminations each of which is a turn of an edge-wound helix, the said stator being held together in a rigid unit by a plurality of welds extending transversely of the peripheries of the laminations, the said stator being characterized by the fact that each lamination is tapered so that its thickness between the roots of its teeth and its periphery decreases and by the further fact that each of said welds is produced by mash welding a material softened during the welding operation into the resulting spaces between the laminations.

2. The method of producing a stacked part of a motor such as a stator which comprises stamping teeth into a strip of magnetic material, producing a taper in said strip such that the thickness of said strip between the roots of the teeth and the rim opposite said root decreases, forming said strip into an edge-wound helix, compressing said helix and mash welding a material which softens during the welding operation transversely along the peripheries of the turns of the helix into the spaces between the turns.

3. A stacked part for a motor such as a stator consisting of laminations held together in a tightly compressed unit by a plurality of welds extending transversely of the peripheries of the laminations, the said stator being characterized by the fact that each lamination is tapered, so that its thickness between the roots of its teeth and its periphery decreases and by the further fact that each said weld is produced by mash welding a material which softens during the welding operation into the resulting spaces between the laminations.

4. Apparatus for welding an annular stack constituting a part of a motor or like device and having teeth, said stack being made up of laminations, each lamination being tapered along the edge remote from the teeth, the said apparatus comprising a mandrel adapted to engage said stack internally and having keys adapted to engage said teeth, a first welding electrode, a second welding electrode, a first rod, a second rod, means for mounting said stack keyed by said mandrel so that said first and second rods are held between said first and second electrodes respectively and the periphery of said stack at spaced points along said periphery, means for supplying current between said electrodes for welding said rods to said periphery, and means for applying pressure to said electrodes so that the material of said rods penetrates into the spaces between said tapered portions of said laminations.

5. A stacked part for a motor such as a stator consisting of laminations each of which is a turn of an edge-wound helix, the said stator being held together in a rigid unit by a plurality of welds extending transversely of the peripheries of the laminations, the said stator being characterized by the fact that each lamination has a narrow thickened rim around its periphery and is tapered so that its thickness between the roots of its teeth and the rim around its periphery decreases and by the further fact that each of said welds is produced by mash welding a material softened during the welding operation into the resulting spaces between the laminations, said rim being so thin that it is upset in the region of the weld during said welding operations.

6. The method of producing a stacked part of a motor such as a stator which comprises stamping teeth into a strip of magnetic material, producing a taper in said strip such that the thickness of said strip between the roots of the teeth and the rim opposite said root decreases, forming said strip into an edge-wound helix, compressing said helix and mash welding a rod of a material which softens during the welding operation transversely along the peripheries of the turns of the helix into the spaces between the turns, said mash welding being effected by producing a resistance weld between said rod and said helix.

7. A stacked part for a motor such as a stator consisting of laminations held together in a tightly compressed unit by a plurality of welds extending transversely of the peripheries of the laminations, the said stator being characterized by the fact that each lamination has a thickened rim around its periphery and is tapered, so that its thickness between the roots of its teeth and the rim on its periphery decreases and by the further fact that each said weld is produced by mash welding a material which softens during the welding operation into the resulting spaces between the laminations, the width of said rim being so small that during said mash welding the material in said rim in the region of said weld is upset to permit the penetration of the melted fusible material into the spaces between said lamination.

8. The method of producing a stacked part of a motor such as a stator which comprises stamping teeth into a strip of magnetic material, producing a taper in said strip such that the thickness of said strip between the roots of the teeth and the rim opposite said root decreases, forming said strip into an edge-wound helix, compressing said helix and mash welding a rod of a material which softens during the welding operation transversely along the peripheries of the turns of the helix into the spaces between the turns, said mash welding being effected by producing a resistance weld between said rod and said helix, the resistance weld being produced by welding current which flows along a portion of the rim of said helix between a pair of welding electrodes both of which engage the periphery of said helix.

9. The method of producing a stacked part of a motor such as a stator which comprises stamping teeth into a strip of magnetic material, producing a taper in said strip such that the thickness of said strip between the roots of the teeth and the rim opposite said root decreases, forming said strip into an edge-wound helix, compressing said helix, keying said compressed helix with keys engaging said teeth and mash welding a rod of a material which softens during the welding operation transversely along the peripheries of the turns of the helix into the spaces between the turns, said mash welding being effected by producing a resistance weld between said rod and said helix, the resistance weld being produced by welding current which flows along a portion of the rim of said helix between a pair of welding electrodes both of which engage the periphery of said helix, said helix remaining keyed by said keys during the welding operation.

References Cited in the file of this patent

UNITED STATES PATENTS

| | | |
|---|---|---|
| 1,920,354 | Carpenter | Aug. 1, 1933 |
| 2,300,700 | Porter et al. | Nov. 3, 1942 |
| 2,394,822 | Teplitz | Feb. 12, 1946 |
| 2,680,285 | Furnas | June 8, 1954 |

OTHER REFERENCES

"Welding Journal," June 1955, vol. 34, pp. 559–567, article by Pilia.